March 6, 1951  C. K. HEASLEY  2,543,777
SANDPAPER OF IMPROVED DURABILITY HAVING AN ADHESIVE
BOND WHICH IS PREDOMINANTLY WATER SOLUBLE
Filed April 4, 1949
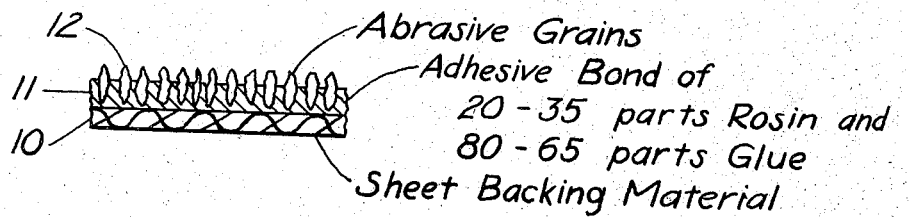
INVENTOR
Charles K. Heasley
by
Carpenter, Abbott, Coulter + Kinney
ATTORNEYS Patented Mar. 6, 1951

UNITED STATES PATENT OFFICE 2,543,777

2,543,777

SANDPAPER OF IMPROVED DURABILITY HAVING AN ADHESIVE BOND WHICH IS PREDOMINANTLY WATER SOLUBLE

Charles K. Heasley, St. Paul, Minn., assignor to Minnesota Mining & Manufacturing Company, St. Paul, Minn., a corporation of Delaware Application April 4, 1949, Serial No. 85,322

6 Claims. (Cl. 51—300)

This invention relates to a new composition of matter, and to its uses. More particularly, it concerns an adhesive or resinous composition of matter, especially one containing two or more ingredients, where the ingredients are at least partially incompatible or insoluble.

This application is a continuation-in-part of my copending application Serial No. 490,792, filed June 14, 1943, and now abandoned.

My invention concerns a composition containing, as its principal components, a resinous material, such as rosin, so dispersed in an aqueous solution of a water-soluble proteinaceous colloid, such as glue, that the resulting dispersion is entirely stable, and it also relates to such a composition with the water eliminated, and to articles or products made therewith.

I have found that such compositions have advantages over straight glue, and also over the individual ingredients thereof, for various adhesive usages, such as an improved bonding agent in the manufacture of coated abrasive articles, for wood-joints, veneer, and many other applications where glue ordinarily is used.

Glue is somewhat brittle when sufficiently dried, whereas it is much weaker, but quite flexible, in a damp atmosphere. When glue is used as a bonding agent in the manufacture of coated abrasive articles, the glue bond is generally sufficiently tough to securely anchor the abrasive grains to the backing. However, difficulty has been experienced in obtaining sufficient flexibility in the adhesive, while maintaining the toughness, to enable the glue to adapt itself to changes of volume and shape consequent upon setting, ageing, warping, shrinking, swelling, humidity changes, or variations in temperature, and also to withstand impact or actual bending of the backing itself.

I have found a new and novel composition adapted to replace a straight glue adhesive, especially as a bonding agent for coated abrasive articles, which has many advantages and is an improvement over a straight glue adhesive. For example, a coated abrasive article in which my new adhesive composition has been used to bond the layer of abrasive grains to the backing, possesses a greatly increased life and durability over a coated abrasive article wherein glue alone has been used as the bonding agent. Not only is there produced by my invention a high tack, high strength adhesive, but furthermore the adhesive can also be produced at a substantial saving over a straight glue adhesive.

I have further found that films of my dried adhesive are less subject to deterioration or variations due to changes in temperature and humidity, and dried films thereof are less readily dissolved by water, than films of other common water-soluble adhesives. This characteristic is of importance in the consideration of a water-soluble adhesive material, as the continuous changes in the weather subject a water-soluble adhesive, such as glue, to variations in temperature and humidity, particularly the latter, which results in shrinkage and splitting away of the adhesive film from the material so bonded together.

Accordingly, it is an object of this invention to produce an improved adhesive composition, which is superior in quality to that of straight glue, and is adapted for use for the same purposes as glue and in replacement thereof. Another object is to produce compositions of matter adapted for uses which straight animal glue and the like are not properly qualified to fill.

Another object of my invention is to produce an adhesive composition which contains as its principal components a resinous material, such as rosin, so dispersed in an aqueous solution of a water-soluble proteinaceous colloid, such as glue, that the resulting dispersion is entirely stable; and such that, upon evaporation of water, a heterogeneous solid composition is provided (with the rosin or the like dispersed in the glue or the like) which is well adapted for uses which straight animal glue is not adapted to, or is less qualified to serve.

A further object is to produce a high tack, high strength adhesive, especially adapted for use in coated abrasive articles, which is relatively unaffected by changes in temperature and humidity, and which can be economically produced, preferably at a saving over a straight glue adhesive. Another object is to provide an abrasive article of the coated abrasive type which is superior to straight glue-bond sandpaper. A further object is to provide furniture and other constructions having joints of improved durability and strength, due to the use of compositions herein described. These and other objects and advantages will be apparent from the description taken as a whole.

A preferred embodiment of the invention is shown in the enlarged vertical cross-sectional view in the drawing, in which the reference character 10 indicates sheet backing material to which abrasive grains 12 are secured by applicant's improved adhesive bond 11.

A contemplated composition, illustrative of my invention, is an adhesive material comprising rosin dispersed in an aqueous solution of glue, the rosin making up from about 10 to about 45% of the solids content, e. g. 25% thereof, and the glue making up from about 55 to about 90% of the solids content of said adhesive composition, e. g. 75% thereof.

Therefore, having indicated in a general way the nature and purpose of this invention, the following examples will illustrate the same. In the examples, the ingredients are given in parts by weight, unless otherwise indicated.

EXAMPLE 1

A 25% rosin-75% glue dispersion was prepared as follows:

| | Parts |
|---|---|
| Glue (hide glue) | 30 |
| N-wood rosin | 10 |
| Water | 60 |

30 parts of hide glue were dissolved in 30 parts of water so as to prepare a 50% glue solution, and the resulting aqueous glue solution was heated at 150–160° F. The N-wood rosin (M. P. 160–170° F.) was melted in a separate container. When molten, the rosin was slowly added to the hot glue solution, while stirring the solution with a high speed mixer, i. e. a "Lightnin" mixer. A uniform dispersion resulted in which the glue was the continuous phase, and the rosin the dispersed phase. 30 parts of water were then added to bring the dispersion to a total solids content of 40%. Substantially all of the dispersed rosin particles were of less than 60 micron particle size, with the majority having a particle size of from 2 to 12 microns. The particle size of the rosin, as well as its percentage, is or appears to be of real importance in respect to the properties of the final composition.

EXAMPLE 2

A 25% rosin-75% glue dispersion was prepared as follows:

| | Parts |
|---|---|
| Glue | 1,336 |
| N-wood rosin | 447 |
| Xylene | 69 |
| Water | 1,648 |

1336 parts of hide glue were added to 1648 parts of water. After the glue had gelled, the solution was heated at a temperature of 180° F. until the glue was "cooked out," i. e. until the glue is free from lumps and is in solution form. 447 parts of N-wood rosin (M. P. 160–170° F.) were melted in a separate container, to which were added 69 parts of xylene. The rosin was cooled to the temperature of the glue, i. e. 180° F., and slowly added to the aqueous solution of glue, while stirring the solution with a high speed agitator, i. e. a "Lightnin" mixer. The agitation was continued for 30 minutes. A homogeneous dispersion resulted, having a total solids content of 51%, in which the glue was the continuous phase, and the rosin the dispersed phase. Substantially all of the dispersed rosin particles were of less than 60 micron particle size, with the majority having a particle size of from 2 to 12 microns.

In general it is easier to get a fine particle size of dispersed material with the method of Example 2 (employing solvent for the rosin) than with the method of Example 1.

*Comparison of coated abrasive sheet material bonded with the composition of Example 1 with coated abrasive sheet material bonded with straight animal glue*

Abrasive sheets were prepared by coating Alundum abrasive grains on a flexible drill cloth backing, using the 25% rosin-75% glue composition, prepared according to the method of Example 1 as the abrasive bonding or binder coat. Similar abrasive sheets were prepared except that a 100% straight glue composition was used as the adhesive coat for bonding the abrasive grains. The method of coating or depositing the abrasive grits was the same in both cases and generally as disclosed in U. S. Patent to Carlton No. 2,318,570. These sheets were prepared according to the following standards:

97 grains per 4 x 6 inch area of grit 60 Alundum were deposited on 42" x 1.97 drill cloth backing (i. e. 42 inches wide and of a thickness or weight such that 1.97 linear yards of such width weigh 1 pound). The drill cloth had a thread count of 72 x 48. 45 grains per 4 x 6 inch area of a 48% solids content adhesive composition, containing 25% rosin-75% glue, particularly that prepared according to Example 1, were used in the making or binder coat, and 46 grains per 4 x 6 inch area of a 27% solids content of the same adhesive dispersion were used in the sandsizing coat. The abrasive sheet was then cured by air drying until the adhesive composition was thoroughly dried.

102 grains per 4 x 6 inch area of grit 60 Alundum were deposited on 42" x 1.97 drill cloth backing with a thread count of 72 x 48, using a 100% straight hide glue, in the identical manner as above. 44 grains per 4 x 6 inch area of a 48% solids content aqueous solution of glue were used in the making coat, and 58 grains per 4 x 6 inch area of a 27% solids content glue solution were used in the sandsizing coat. The abrasive sheet was then cured by air drying as above.

The performance of the abrasive sheets thus prepared was compared by testing them on a standard rocking drum type testing machine. This test consisted of securely fastening an abrasive sheet with grit side exposed, to the circumference of the drum of the testing machine. The abrasive-covered drum was then given a rocking motion. A working piece consisted of a $\frac{3}{16}$ inch square steel bar was held under constant pressure perpendicular to the abrasive sheet. The rocking motion of the drum, at the rate of 60 strokes per minute, caused the abrasive sheet to exert a cutting action against the steel rod. An air blast was provided to keep the abrasive free of any dust which might tend to retard the cutting action. A record was kept of the number of strokes, i. e. each stroke being one forward and backward motion of the abrasive-covered drum against the steel rod, required to reach the end point, i. e. that point at which the mineral ceased to exert a cutting action on the steel bar. A record was also kept of the mineral loss and the amount of steel cut. The results of the test were as follows:

| Adhesive Identity | Strokes | Cut | Cut | Mineral Loss | Mineral Loss |
|---|---|---|---|---|---|
| | | Grams | Per Cent | Grams | Per Cent |
| 25% rosin-75% glue | 2,250 | 3.251 | 335.1 | .408 | 84.6 |
| 100% straight glue | 760 | .970 | 100.00 | .482 | 100.00 |

Another series of identically prepared abrasive sheets were tested as a check series with the following results:

| Adhesive Identity | Strokes | Cut | Cut | Mineral Loss | Mineral Loss |
|---|---|---|---|---|---|
| | | Grams | Per Cent | Grams | Per Cent |
| 25% rosin-75% glue | 2,245 | 3.294 | 334.7 | .383 | 74.3 |
| 100% straight glue | 860 | .984 | 100.0 | .515 | 100.0 |

As shown by these tests, sandpaper in which the abrasive binder or bonding coat is composed of rosin dispersed in glue possesses performance characteristics which are outstanding, and are superior to straight glue bonded sandpaper by about 235%, as evidenced particularly by the above figures showing "cut" and endurance (i. e. "strokes").

*Comparison of coated abrasive sheet material bonded with 35% rosin dispersed in 65% glue, and 45% rosin dispersed in 55% glue, with coated abrasive sheet material bonded with straight animal glue*

A further series of abrasive sheets were prepared following the method as described in the above test, according to the following standards:

99 grains per 4 x 6 inch area of grit 60 Alundum were deposited on 42" x 1.97 drill cloth backing with a thread count of 72 x 48, using a 35% rosin-65% glue composition, prepared according to the method of Example 2. 45 grains per 4 x 6 inch area of a 48% solids content rosin-glue dispersion were used in the making coat, and 54 grains per 4 x 6 inch area of a 27% solids content dispersion were used in the sandsizing coat. The abrasive sheet was then cured by air drying.

99 grains per 4 x 6 inch area of grit 60 Alundum were deposited on 42" x 1.97 drill cloth backing with a thread count of 72 x 48, using a 45% rosin-55% glue composition, prepared according to the method of Example 2. 45 grains per 4 x 6 inch area of a 48% solids content rosin-glue dispersion were used in the making coat, and 52 grains per 4 x 6 inch area of a 27% solids content dispersion were used in the sandsizing coat. The abrasive sheet was cured by air drying as above.

107 grains per 4 x 6 inch area of grit 60 Alundum were deposited on 42" x 1.97 drill cloth backing with a thread count of 72 x 48, using a 100% straight-glue composition. 43 grains per 4 x 6 inch area of a 48% solids content glue dispersion were used in the making coat, and 52 grains per 4 x 6 inch area of a 27% solids content dispersion were used in the sandsizing coat. The abrasive sheet was then cured by air drying as above.

The abrasive sheets were tested on a standard rocking type testing machine in the same manner as in Example 3 with the following results:

| Adhesive Identity | Strokes | Cut | Cut | Mineral Loss | Mineral Loss |
|---|---|---|---|---|---|
| | | Grams | Per Cent | Grams | Per Cent |
| 35% rosin-65% glue | 4,900 | 5.654 | 239.1 | .496 | 102.0 |
| 45% rosin-55% glue | 3,210 | 3.665 | 155.0 | .505 | 103.9 |
| 100% straight glue | 1,575 | 2.364 | 100.00 | .486 | 100.0 |

The above test and other tests show that from about 25 to 35% rosin content of the dispersion of rosin in glue appears to be the optimum concentration for best results. Lesser percentages of rosin, e. g. 10 to 25%, provide advantages but, in general, at least about 20% should be used. When the rosin content is increased to 45%, performance of the sandpaper made with such composition decreases. More than 45% rosin content is not recommended, as difficulty is experienced in keeping the glue in the continuous phase, and the rosin in the dispersed phase. Furthermore, as stated above, performance decreases when more than about 35% of rosin is used, so that the improvement over straight glue is lessened.

While the superiority of my new and novel composition over 100% straight animal glue, when used in abrasive sheet material, has been shown based on the above specific tests, carried out on a standard type testing machine, it is to be understood that the degree of specific improvement will vary under the particular conditions of use. However in a wide variety of commercial abrading operations, in which coated abrasive sheet material of this invention was tested against a 100% straight glue bonded abrasive sheet material, the abrasive sheet material of this invention has consistently showed marked superiority.

Various methods may be used to disperse the rosin, or equivalent, in the glue to prepare my adhesive composition, e. g. Example 1 shows a method of mechanically dispersing rosin without the use of a solvent. This method generally consists of dissolving glue, or equivalent, in water, according to accepted practices for adhesives of this type, until a concentration ranging from 30 to 50% is reached. The aqueous solution is then heated at a temperature within the range of 150°–180° F. The rosin should be melted in a separate container. While the melting point of N-wood rosin, for example, is about 160–170° F., the rosin usually is heated to 200–220° F. during the melting, and preferably should then be cooled to about 180° F. before being added to the glue, so as to avoid injuring the glue. The rosin is slowly added to the hot viscous glue solution, while the solution is stirred with a high speed mixing unit, for example, a "Lightnin" mixer, for a period of about 30 minutes. High speed agitation should be used, as slow speed stirring (in the absence of a dispersing agent as in the present example) will result in the particle size of much of the rosin being larger than 12 microns or even larger than 60 microns, which is undesirable. Speed of stirring, temperature of rosin, and viscosity and temperature of glue solution are preferably so regulated as to produce rosin particles having a particle size of about 2 microns, up to about 12 microns. The rosin may be added in quantities ranging from 10 to 40% or 45% of the total solids content of the rosin-glue dispersion, although rosin in quantities of 15 or 20% to 35% is preferred. Care should be taken that the proteinaceous material or equivalent forms the continuous phase, while the rosin forms the dispersed phase. It has been found that with over 45% content of rosin, performance of the adhesive is materially lessened, and there is a tendency for some of the rosin to form the continuous phase, rather than the dispersed phase. Thus, the use of over 45% rosin should be avoided.

If it is desired to disperse the rosin or equivalent by means of a solvent, as shown in Example 2, various solvents may be used, such as methyl alcohol, ethyl alcohol, turpentine, hydrocarbon solvent, etc., depending on the particular material to be dispersed. However, the choice of a solvent should be such that it will not exert a detrimental effect on the glue.

I have found that the particle size of the rosin dispersed in the proteinaceous material is important. Thus, substantially all of the dispersed rosin particles should be less than about 60 microns in size, and preferably less than about 12 microns. Optimum results are obtained when the majority of the particles are of a particle size of from about 2 to 12 microns, the smaller particles (of the order of 2 microns) being preferred.

Hereinabove I have illustrated my invention primarily in connection with compositions in which wood rosin or the like is dispersed in animal glue. My invention is not limited to the use of these specific ingredients, or to compositions which necessarily contain or include these specific ingredients. I have found that I can produce compositions which have a number of advantages over straight animal glue by employing various other materials in lieu of some or all of the ordinary rosin. The substitutes which I have investigated include such illustrative materials as the following:

(1) Hydrogenated rosin, such as "Staybellite" made by Hercules Powder Company;

(2) Heat-treated rosins, such as Solros rosin made by General Naval Stores, New York city, or materials such as resin acids of suitable melting point and/or other modified rosins such as polymerized rosins, dehydrogenated rosins, etc.;

(3) Hard asphalt, such as gilsonite;

(4) Certain cellulose derivatives, including ethers and esters of cellulose, e. g. ethyl cellulose and cellulose nitrate or acetate;

(5) Certain synthetic elastomers, including olefine-polysulfides or organic polysulfide resins, e. g. "Thiokol," made by the Thiokol Corporation, Trenton, New Jersey;

(6) Rubber, e. g. reclaimed rubber (added as a pre-formed 50% dispersion in water containing potassium oleate as a dispersing agent);

(7) Certain alkyd resins, including alkyd resins modified with natural resin acids, such as "Teglac" made by American Cyanamid & Chemical Corp., New York;

(8) "Nevillite" resin, made by the Neville Corp., Pittsburgh, which is illustrative of a hydrogenated polymer or a mixture of polymers of very low iodine number derivable from non-nitrogenous polymerizable coal tar unsaturates. (For further information on this type of substantially non-acidic synthetic resin, reference is made to U. S. patent to Carmody No. 2,152,533, issued March 28, 1939, and to the article in "Industrial Engineering Chemistry," vol. 32, pages 684 to 692, May 1940);

(9) "Vanadiset," sold by the Wilson Carbon Company, New York, a resin-like thermoplastic petroleum pitch softening at 200° F. or above and containing about 0.25 percent of vanadium pentoxide; see the decsription given in the Warth et al. U. S. Patent No. 2,413,093;

(10) Chemically modified rosins including rosin esters or salts including ester gum "Piccolyte" (sold by Pennsylvania Industrial Chemical Corp.), zinc treated rosins such as "Zitro" and the like; and certain natural resins or gums such as damar and East India gum. Also, a very finely divided carbon black has some utility when combined with the glue;

(11) Coumarone-indene resins, e. g. "Cumar."

Of the various resinous materials hereinabove set forth, rosin and treated rosin, "Nevillite," "Piccolyte," gilsonite or other hard asphalt, and hard coumarone-indene resins offer advantages, particularly in comparison with the materials of higher softening temperatures, both as to economy and as to ease of incorporation in my binder compositions, as well as in the properties of the coated abrasive products made therewith, and I therefore prefer to employ these thermoplastic, water-insoluble, normally solid resinous materials in making the novel products and compositions of my invention.

While it is difficult to state precisely the common characteristics of the several materials recited which make them useful as modifiers for glue to produce my new and improved compositions of matter, in general the rosin and substitutes therefore fall in the class of being water-insoluble organic resinous materials that are normally solid at room temperatures. Additionally, they must be materials which it is possible to intimately disperse in the glue or equivalent. Thus, the material should either melt to an easily dispersed liquid at the temperature of the hot glue solution, or should be reducible to a fluid and easily dispersed state with a volatile vehicle which has no harmful effect on the glue or equivalent binder material, or should be otherwise capable of dispersion in finely divided form in the binder. The preferred thermoplastic and normally solid resins listed in the preceding paragraph will be recognized as having a softening temperature of the order of 160° F.–210° F., or thereabouts, and hence require no solvent addition or other treatment to render them dispersible. In any event, the material recited, when combined with animal glue in a fine state of subdivision and in generally the proportions hereinabove illustrated (the glue being in the continuous phase), yield a composition of matter which is superior to straight animal glue for many purposes, such as sandpaper bonds, furniture "glue," etc. Furthermore, the improvements with most of these materials are very outstanding.

The optimum proportions of the various substitutes vary somewhat. For example, ethyl cellulose employed in the proportion of 5%, to 95% of animal glue, provides a decided improvement; "Thiokol" employed to the extent of 10%, to 90% of animal glue, provides a substantial improvement, and this proportion is also sufficient in the case of reclaimed rubber to provide a substantial improvement. Otherwise with the materials above named, the optimum proportions approach more closely 25%, to 75% of glue, with the maximum proportion being such in all cases that the glue or equivalent always constitutes the continuous phase of the dispersion.

On the other hand, my invention is not restricted solely to compositions which contain animal glue as a predominant ingredient, or even to compositions which necessarily include animal glue. As substitutes for a portion or all of the animal glue I contemplate: (1) casein (an alkaline aqueous solution); (2) blood albumen, (3) zein dissolved in an aqueous alkaline solution or in an organic solvent, (4) soya bean flour, (5) dextrin, starches, and certain other amylaceous materials, and (6) compositions comprising or including such synthetic or resinous materials as polyvinyl alcohol.

It will be noted that, in general, all of the materials just recited fall in the class of being soluble in water, or in aqueous solutions, e. g. of alkaline nature, and also in general have substantial adhesive properties.

It will be appreciated that where animal glue is replaced in whole or in part by one or more substitutes, that the optimum proportions of the rosin or equivalent may vary somewhat from the illustrative proportions set out above, but in general, as above emphasized, the glue or equivalent will always make up the continuous phase and the rosin or substitute therefor will make up the dispersed phase.

There are definite advantages under certain circumstances to have the material dispersed of the same order of specific gravity or density as the animal glue or equivalent.

In general, for the uses above mentioned, the dispersed material should not melt below room temperatures and commonly it should have a melting point at least as high as about 120° F. and, when it is desired to employ the composition of matter as a binder or bond in coated abrasive sheet material, it is generally preferable that the dispersed material have a melting point at least as high as approximately 150° F. and many of the advantageous materials have a substantially higher melting point, "Vanadiset," mentioned above, having a melting point of the order of 400° F.

While the invention has been illustrated above in certain specific details and certain substitute materials falling in several classes have been recited, various modifications and other substitutes will readily occur to those skilled in the art in the light of this disclosure and all such modifications and variations are of course hereby comprehended.

The uses and adaptations of the novel compositions herein disclosed have of course also been illustrated only in reference to certain specific applications, especially in respect to adhesive bonds for coated abrasive sheet material. It will also be clear that the invention is not limited to such applications and combinations but also has utility in connection with other structures and products, as in connection with the "glue" joints of furniture and various articles made from wood, in the production of veneers, in the making of packages or packaging materials, belting such as laminated belts of leather or the like, book binding, gummed cloth and adhesive tape. It may also be employed as a primer in making pressure-sensitive adhesive tapes, e. g. to provide a layer intermediate the paper, cellophane or other backing and the pressure-sensitive adhesive layer, which latter may be a rubber-resin adhesive.

To further understand the present invention and the scope thereof, the following is to be noted:

It has long been known that animal glue can be used as a binder for sandpaper and, as such, that the animal glue has a number of advantages. One of the characteristics of animal glue, which, however, limits the scope of usefulness of sandpaper bonded with a straight, 100 percent animal glue is its water-sensitivity or solubility. In view of this, there have been various efforts to produce waterproof sandpaper, which latter, in one form or another, has now been a commercial product for a number of years. Among the efforts to produce waterproof sandpaper, it has been suggested that minor amounts of glue may be incorporated in, and completely shielded by, a water-resistant or insoluble resinous material, which might of course include rosin. Within my knowledge, such a composition of matter has never found any commercial application in the commercial production of waterproof sandpaper or any kind of sandpaper or coated abrasives, and it will be clear from the description given hereinabove that such types of compositions or constructions are not hereby contemplated. It is essential, in order to secure the advantages of my invention, that the glue or equivalent constitute the continuous phase and the rosin or equivalent constitute the dispersed phase of my dispersion product, which may be employed as the binder and/or sandsizing coat in sandpaper, or for use in "gluing" furniture, or for various other coating, adhesives, etc. operations or uses.

It is also to be understood that the compositions herein described, e. g. rosin dispersed in glue, may be used as the binder or making coat in sandpaper or coated abrasive articles with a similar or dissimilar sandsizing coat, e. g. a heat-convertible synthetic resin such as straight phenol aldehyde, an alkyd resin, a silicate cement, etc. On the other hand, my compositions hereinabove described may simply be used as a sandsizing coat in such constructions where the binder coat is dissimilar and may be straight animal glue, silicate cements, synthetic resins, or the like.

What I claim is:

1. A flexible abrasive article of the coated abrasive type characterized in that the abrasive grains are bonded to a flexible sheet backing material by an adhesive bond which consists substantially of (1) a substance from the group consisting of proteinaceous, amylaceous and polyvinyl compounds, and further characterized by being a water-soluble colloidal organic adhesive and (2) a water-insoluble, normally solid, thermoplastic organic resin, said ingredients being present in the proportion by weight of 90 to about 55 parts of said water-soluble colloidal adhesive to correspondingly 10 to about 45 parts of said resin, said water-soluble colloidal adhesive being present in the continuous phase and the resin being dispersed therein, the resin being substantially completely of a particle size less than 60 microns, and predominantly of a particle size of about 2 to 12 microns.

2. A flexible abrasive article of the coated abrasive type characterized in that the abrasive grains are bonded to a flexible sheet backing material by an adhesive bond which consists substantially of a water-soluble colloidal proteinaceous adhesive and a water-insoluble, normally solid, thermoplastic organic resin, said ingredients being present in the proportion by weght of about 90–60 parts of said proteinaceous adhesive to correspondingly about 10–40 parts of said resin, said proteinaceous adhesive being present in the continuous phase and the resin being dispersed therein, the resin being substantially completely of a particle size less than 60 microns, and predominantly of a particle size of about 2 to 12 microns.

3. A flexible abrasive article of the coated abrasive type characterized in that the abrasive grains are bonded to a flexible sheet backing material by an adhesive bond which consists substantially of a water-soluble colloidal proteinaceous adhesive and a water-insoluble thermoplastic organic resin solid at room temperature and softening at temperatures within the range of about 160–210° F., said ingredients being present in the proportion by weight of about 85–65 parts of said proteinaceous adhesive to correspondingly about 15–35 parts of said resin, said proteinaceous adhesive being present in the continuous phase and the resin being dispersed therein, the resin being substantially completely of a particle size less than 60 microns, and predominantly of a particle size less than 12 microns.

4. A flexible abrasive article of the coated abrasive type characterized in that the abrasive grains are bonded to a flexible sheet backing material by an adhesive bond which consists substantially of about 80–65 parts of animal glue as the continuous phase and, uniformly dispersed throughout said glue, correspondingly about 20–35 parts of a water-insoluble, thermoplastic, normally solid organic resin, said resin being substantially completely of a particle size less than 60 microns, the majority of the particles being of a particle size of about 2 to 12 microns.

5. An abrasive article of the coated abrasive type characterized in that the abrasive grains are bonded to a sheet backing material by an adhesive bond which consists substantially of animal glue and rosin as solids ingredients, said ingredients being present in the proportion by weight of about 85–65 parts of glue to correspondingly about 15–35 parts of rosin, said glue being present in the continuous phase and the rosin being dispersed therein, the rosin being substantially completely of a particle size less than 60 microns, and predominantly of a particle size less than 12 microns.

6. An abrasive article of the coated abrasive type characterized in that the abrasive grains are bonded to a sheet backing material by an adhesive bond which consists substantially of animal glue and rosin as solids ingredients, said ingredients being present in the proportion by weight of 75 parts of glue to approximately 25 parts of rosin, said glue being present in the continuous phase and the rosin being dispersed therein, the rosin being substantially completely of a particle size less than 60 microns, and predominantly of a particle size less than 12 microns.

CHARLES K. HEASLEY.

REFERENCES CITED

The following references are of record in the file of this patent:

UNITED STATES PATENTS

| Number | Name | Date |
|---|---|---|
| 172,162 | Peabody | Jan. 11, 1876 |
| 1,468,960 | Crupi | Sept. 25, 1923 |
| 2,325,172 | Borglin | July 27, 1943 |
| 2,419,194 | Barwell | Apr. 22, 1947 |